United States Patent [19]

Mangelsen et al.

[11] Patent Number: 5,399,837
[45] Date of Patent: Mar. 21, 1995

[54] WIRE BRAKE FOR ROBOTIC WELDING TORCH

[75] Inventors: Jan C. Mangelsen, Charlotte, Iowa; Douglas K. Boyd, Colona, Ill.

[73] Assignee: Genesis Systems Group, Ltd., Davenport, Iowa

[21] Appl. No.: 223,717

[22] Filed: Apr. 6, 1994

[51] Int. Cl.⁶ .................................................. B23K 9/12
[52] U.S. Cl. .............................. 219/137.7; 219/125.1; 901/42
[58] Field of Search ............. 219/137.2, 137.7, 137.71, 219/124.34, 137.61; 242/156, 156.1; 279/4.1, 4.11, 4.12; 901/42

[56] References Cited

U.S. PATENT DOCUMENTS

| | | |
|---|---|---|
| 2,409,593 | 12/1949 | Kay . |
| 2,832,604 | 4/1958 | Brusque ..................... 279/4.11 |
| 2,858,908 | 11/1958 | Temple . |
| 3,025,071 | 3/1962 | Larrad ....................... 279/4.11 |
| 3,393,712 | 7/1968 | Fransen . |
| 3,617,688 | 11/1971 | Fogelstrom . |
| 4,249,062 | 2/1981 | Hozumi et al. ............... 219/124.34 |
| 4,295,031 | 10/1981 | Roen . |
| 4,498,563 | 2/1985 | Trahan . |
| 4,538,047 | 8/1985 | Nakano et al. . |
| 4,771,678 | 9/1988 | Walker . |

Primary Examiner—Clifford C. Shaw
Attorney, Agent, or Firm—Zarley, McKee, Thomte, Voorhees & Sease

[57] ABSTRACT

A wire brake for a robotic welding torch includes an adapter which is attached to the upper end of the welding torch and which includes an adapter bore through which the wire electrode is inserted. A cylinder body is threadably attached to the adapter and includes a reciprocating piston having a piston stem which is movable into a brake position engaging the wire electrode so as to hold the wire electrode against axial movement within the adapter bore.

17 Claims, 3 Drawing Sheets

WIRE BRAKE FOR ROBOTIC WELDING TORCH

BACKGROUND OF THE INVENTION

This invention relates to a wire brake for robotic welding torch. Specifically the present invention is used to improve the accuracy of the joint-finding processes which use the wire electrode as a probe. This process is generally known as "touch-sensing" or "seam-finding". The term "wire brake" refers to a clamping device which holds the wire electrode stationary relative to the probe during the touch sensing process.

Typical robotic welding torches include a torch having a longitudinal bore extending therethrough. Within the bore is an elongated electrode wire which protrudes outwardly a short distance form the lower end of the torch, and which also protrudes from the upper end of the torch to a wire feed system. The wire feed system feeds the wire through the torch as the wire is being consumed during the welding process.

The wire extends through a flexible cable from the drive system to the torch. Inside the cable the wire is guided to the torch by a flexible liner usually made of coiled steel or nylon. The inner diameter of the liner is slightly larger then the outer diameter of the wire so that the wire can slide easily through the cable.

During the touch-sensing or seam-finding action, the electrode wire is charged with a voltage. The robot then moves the electrode toward a surface of the work piece. When the electrode contacts the work piece, that contact causes the electrode voltage to discharge. This phenomenon is detected by the robot control and the location of the surface is memorized. The robot can then detect and memorize the locations of multiple surfaces and this data can be used for mathematical calculation of the location of weld joints between the surfaces. The robot can then deliver the electrode exactly to the joint to perform the optimal welding. This type of joint locating method is common in the robotic welding industry.

A problem that frequently occurs with this method is lost motion of the weld wire during movement of the robot and the welding torch. In order to achieve accurate position information, the "stick out" of the electrode is critical. By "stick out" is meant the distance that the electrode wire protrudes from the lower end of the welding torch. During normal movement of the torch by the robot, the weld wire is alternatively tightened and slackened in the flexible liner, and this causes the end of the wire to move in or out with respect to the lower end of the weld torch. The accuracy of the surface detection is therefore compromised. In many cases this lack of accuracy makes robotic technology unusable for some applications.

Wire brakes have been used to secure the wire rigidly to the torch during the seam-finding or touch-sensing action. These prior art devices usually require two actions. One action "brakes" the wire close to the welding torch which prohibits the lost motion from translating to the end of the wire. The other action releases the drive roll tension from the wire to allow the wire to move freely in the cable liner. The releasing action is required because the drive roll tension in prior art devices is stronger then the braking resistance at the torch. Once these two actions are taken the wire end remains in the same position with respect to the torch when the robot moves the torch. When actually welding, the wire brake is released, and the drive rolls are tensioned so as to feed the wire during the welding process.

Many prior art wire brakes include an actuator mounted on the outside of the torch housing. These brake actuators are so large that they interfere with the welding in many situations. The size and the position of the actuator can prevent the robot from positioning the torch for optimal welding.

Welding torches and torch components are consumables in the arc welding process. They are used for both manual and automatic applications. Current wire brake systems are brand and model specific, which inhibits the potential advantage of being able to interchange consumable parts.

Wire brakes presently known in the prior art require custom designed systems, including robotic systems that have wire drivers which are capable of releasing at the same time that the wire brake is actuated. Many wire drive systems are not readily adaptable to this releasing action, and therefore are not adaptable for use with a presently known wire brakes.

Therefore a primary object of the present invention is the provision of an improved wire brake for robotic welding torch.

A further object of the present invention is the provision of an improved wire brake which permits holding the wire securely to the welding torch without the need for releasing the drive rollers at the same time.

A further object of the present invention is the provision of a wire brake which can be applied to different makes and models of welding torches.

A further object of the present invention is the provision of an improved wire brake which protrudes a minimum distance from the welding torch so as to minimize interference with movement of the welding torch during the welding process.

A further object of the present invention is the provision of an improved wire brake which can be fitted within the cylindrical housing of a welding torch.

A further object of the present invention is the provision of an improved wire brake which can be easily assembled and adapted to various types of welding torches.

A further object of the present invention is the provision of an improved wire brake which is economical to manufacture, durable in use and efficient in operation.

SUMMARY OF THE INVENTION

The foregoing objects can be achieved with a wire brake of the present invention which is adapted for use with a robotically controlled elongated torch. The torch includes a longitudinal axis, an upper end, a lower end and a longitudinal bore extending from the upper end to the lower end. An electrode wire extends through the longitudinal bore and has an upper wire end protruding from the upper end of the torch and a lower wire end protruding from the lower end of the torch. The upper end of the torch has an outer boundary surrounding and being spaced radially outwardly from the longitudinal axis of the torch. A first securing means is mounted on the upper end of the torch.

The wire brake includes an elongated adapter having a second securing means attachable to the first securing means on the upper end of the torch. The first and second securing means may be threaded studs and receptacles or may be other attachment devices conventionally known in the art. The adapter includes an adapter bore extending longitudinally therethrough.

The adapter bore is positioned to register with and form a continuation of the upper end of the longitudinal bore in the torch when the adapter is secured by the first and second securing means to the torch.

The adapter includes a brake bore providing communication from outside the adapter to the adapter bore. A cylinder body having a cylinder bore therein is attached to the adapter by a third securing means with the cylinder bore of the cylinder body being in communication with the brake bore of the adapter.

A piston is mounted within the cylinder bore for reciprocating movement therein between a release a position and a brake position. A brake member is movable in unison with the piston and protrudes through the brake bore and at least partially into the adapter bore of the adapter when the piston is in its brake position.

DETAILED DESCRIPTION OF THE PREFERRED EMBODIMENT

Figure 1:
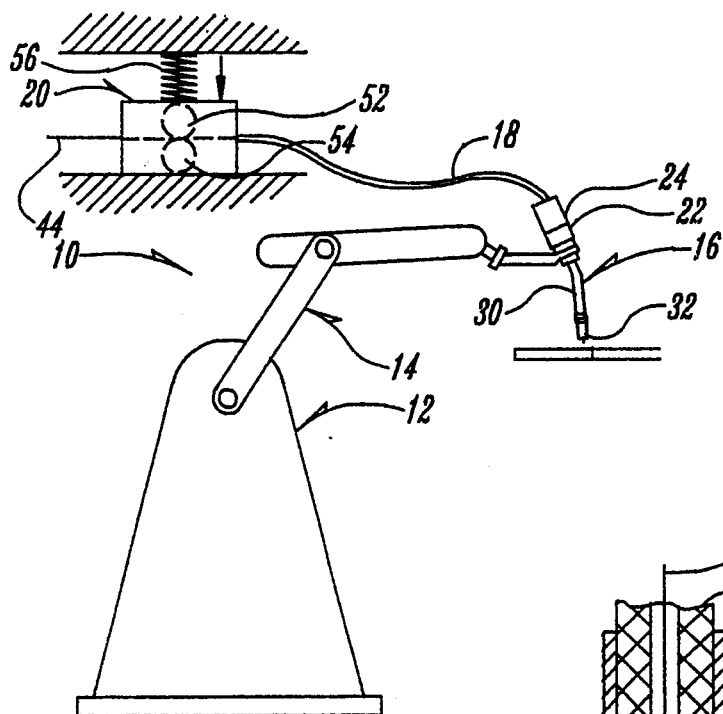
FIG. 1 is an elevational view showing a robotic device schematically and showing the use of a welding torch in combination with the welding device.

Referring to the drawings the numeral 10 generally refers to a robotic welding system including a robotic stand 12 having a robotic arm 14 which grasps and holds a welding torch 16. Extending upwardly from the welding torch 16 is a flexible cable 18 which is attached to a wire driver 20.

Torch 16 includes an upper torch portion 22 having a housing extension 24 threadably secured thereto. Extending vertically downwardly through the upper torch portion is a vertical wire bore 26 which extends downwardly through a torch shank 30 (FIG. 3) and which extends upwardly through a threaded stud 28. The lower end of the torch shank 30 includes a torch nozzle 32 mounted thereon.

Figure 2:
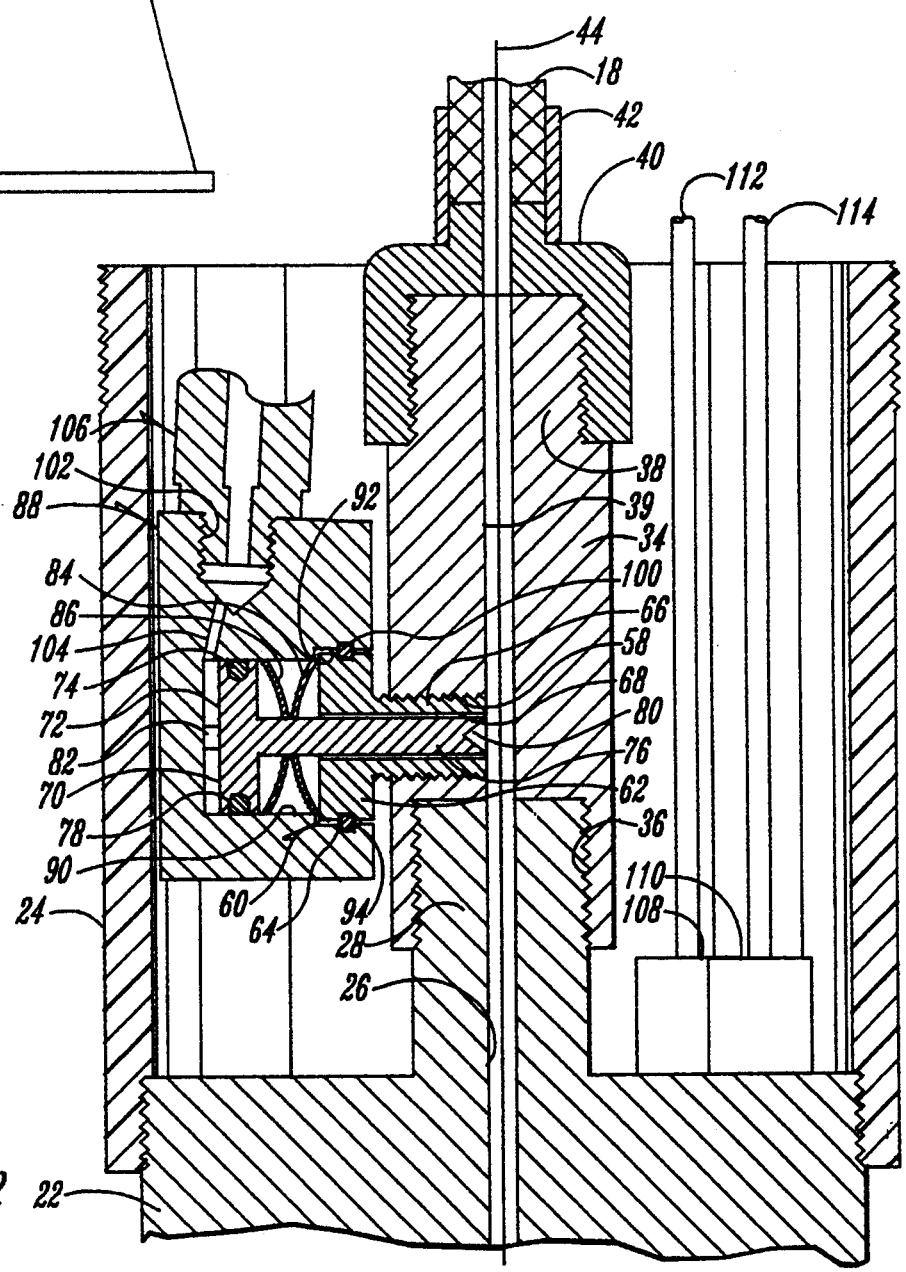
FIG. 2 is an enlarged sectional view of the upper end of the welding torch showing the wire brake attached thereto.
Figure 5:
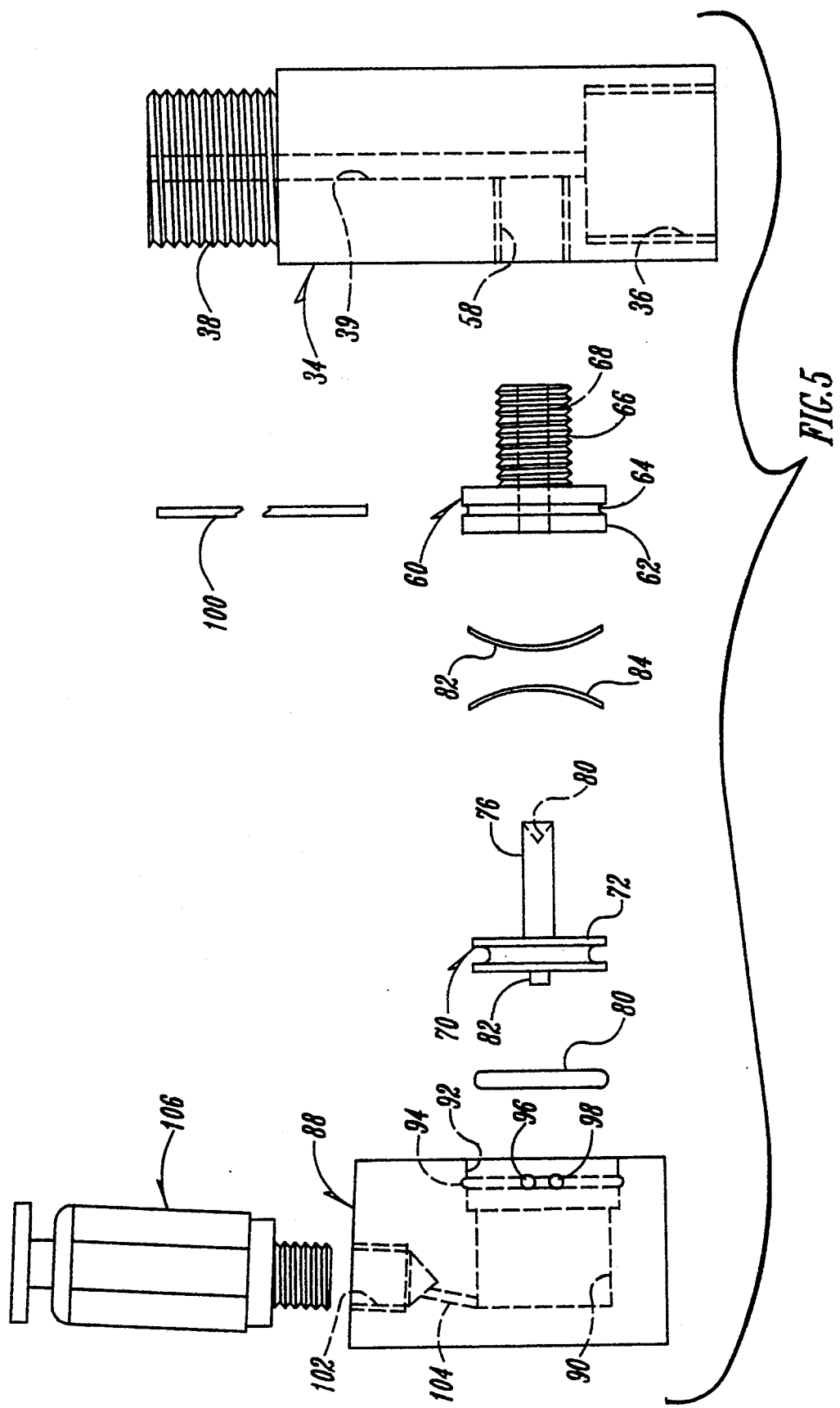
FIG. 5 is an exploded elevational view showing the components of the wire brake.

Referring to FIGS. 2 and 5, an adapter 34 includes a female threaded end 36 on its lower end and a male threaded end 38 on its upper end. Extending vertically through the adapter 34 is an adapter bore 39. The female threaded end 36 of adapter 34 is adapted to be threaded over the upper threaded end of threaded stud 28 so as to secure the adapter to the upper end of the torch with the vertical wire bore 26 of the torch and the adapter bore 39 of the adapter in registered alignment. Threaded over the upper end 38 of the adapter is a cable coupling 40 to which the lower end of cable 18 is attached by means of a cable clamp 42.

Figure 4:
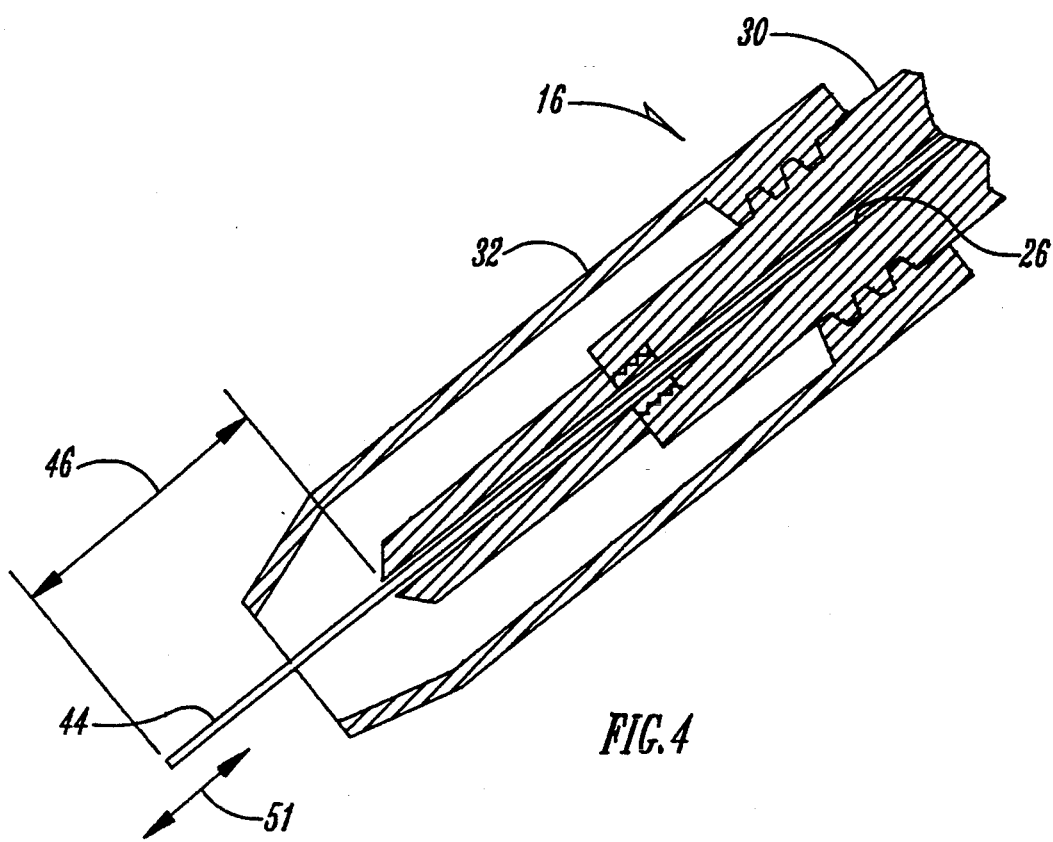
FIG. 4 is an enlarged sectional detail showing the "stick out" of the wire from the lower end of the torch.

A weld wire 44 extends through the vertical wire bore 26 of torch 22, the adapter bore 39 of adapter 34, the cable 18, and the wire driver 22. The lower end of the weld wire 44 sticks out a short distance from the lower end of the torch 16 in the manner shown in FIG. 4. The distance that the wire 44 protrudes from the lower end of the torch 16 is shown by dimension 46 and is referred to as the "stick out".

Figure 3:
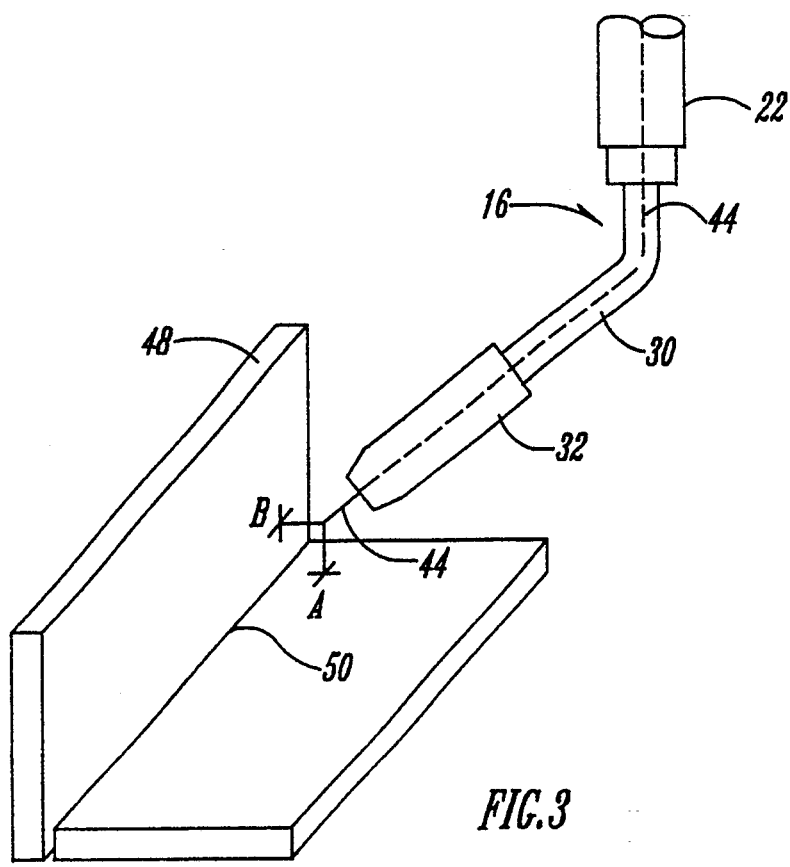
FIG. 3 is a pictorial view illustrating the manner in which the electrode wire is used in the touch-sensing or seam-finding process.

FIG. 3 illustrates the use of the torch and the weld wire to locate the weld seam 50 of a work piece 48. The weld torch 16 is moved distance A until the weld wire touches the work piece at which time the charged weld wire discharges its voltage, thereby telling the control computer that the weld wire has made contact with the work piece. The robotic torch then moves distance B and repeats the process. Each of these dimensions is stored in the computer and the computer mathematically calculates the location of the weld joint 50 from that information.

During this motion, if the weld wire is not securely held in a fixed position relative to the welding torch, there is a certain amount of lost motion in the direction indicated by arrow 51 (FIG. 4), and this lost motion causes error in the computer calculations of the location of the weld joint 50.

The upper end of the weld wire 44 is grasped between two drive rollers 52, 54, one of which is spring mounted by means of a spring 56 so that the two rollers 52, 54 are yieldably movable apart. In prior devices, during the touch sensing operation, the driver rollers 52, 54 have been released, and a braking system has been provided on the torch for gripping the wire. The present invention differs from prior art devices in that it does not require the releasing of the drive rollers 52, 54 during the touch sensing operation.

The adapter 34 includes a threaded brake bore 58 which extends radially inwardly into communication with the vertical adapter bore 39 which houses the wire 44. A cylinder cap 60 is threaded within the threaded brake bore 58 and includes a cap head 62 having an annular groove 64 extending there around, and having a threaded shank 66 which is threaded within brake bore 58. Extending through the threaded shank 66 is a cap bore 68 which is in communication with the interior of the adapter bore 39.

A cylinder body 88 includes a cylinder bore 90 therein having a counter bore 92 at its outer end for receiving the cylinder cap 60. The counter bore 92 has an annular groove 94 (FIG. 5) extending there around which is adapted to register with the annular groove 64 of the cap head 62 as shown in FIG. 2. As can be seen in FIG. 5, a pair of wire entry holes 96, 98 are provided in the cylinder body 88 and communicate with the annular groove 94 of counter bore 92. A retaining wire 100 may be inserted through one of the wire entry holes 96, 98 and may be threaded around the registered annular grooves 64, 94 so as to detachably secure the cylinder body 88 to the cylinder cap 60 as shown in FIG. 2.

Within the cylinder bore 90 is a piston 70 having a piston head 72 with an annular groove 74 extending there around. A piston stem 76 extends axially from the piston head 72 and includes a cupped end 80 located within the cap bore 68. An elastomeric O-ring 78 surrounds the annular groove 74 of the piston 72 and provides sealing engagement with the interior of the cylinder bore 90. A stand off 82 extends from the piston head 72 to prevent the piston head 72 from coming into engagement with the interior end of the cylinder bore 90. A pair of spring washers 84, 86 yieldably urge the piston to the left as viewed in FIG. 2.

An air fitting receptacle 102 is provided in the cylinder body 88 and is in communication with an air passageway 104 which leads to the interior of the cylinder bore 90. An air fitting 106 is threaded within the air fitting receptacle 102 and is adapted to introduce pressurized air to the left of the piston head 72.

During the touch-sensing operation, pressurized air is introduced to the left of the piston 72 so as to force the piston 72 to the right until the cupped end 80 is forced into engagement with the wire 44 within the adapter bore 39. This causes the wire to be rigidly clamped so that it cannot move axially within the adapter bore 39 or the torch bore 26. The gripping force with which the cupped end 80 grasps the wire 44 is sufficient to overcome the gripping action between the two rollers 52, 54 of the driving device 20, and therefore it is not necessary to release the drive rollers 52, 54 as in prior art devices. The stick out distance 46 will remain constant throughout the wire sensing operation due to the strong grip with which the cupped end 80 of stem 76 grabs the wire 44.

After the sensing operation is complete the air pressure is removed from the cylinder bore 90 and the piston is free to move to its release position as shown in FIG. 2.

The torch 22 includes two torch cable connectors 108, 110 each of which is connected to a torch cable 112, 114 respectively. One important feature of the present invention is the fact that the cylinder body 88 and all the other components of the wire brake are maintained within the cylinder housing extension 24 so that they do not protrude radially outwardly beyond the outer perimeter of the torch 22. This prevents the wire brake from interfering with the operation of the torch during the welding process.

Another important feature of the present invention is the ease with which the wire brake can be assembled to any conventional torch. Conventional torches normally have the cable coupling 40 directly connected to the stud 28. In order to insert the present wire brake, all that is necessary to insert the adapter 34 between the cable coupling 40 and the stud 28 on the upper end of the torch 22. The cylinder cap 60 is then treaded into the brake bore 58. The cylinder body 88 is then inserted over the cylinder cap 60 and the retaining wire 100 is threaded into the respective grooves 64, 94 by means of wire entry holes 96, 98. This detachabley secures the cylinder body 88 to the cap 60 and to the adapter 34 without interfering with the torch cables 112, 114.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A wire brake for use with a robotically controlled elongated torch, said torch having a longitudinal axis, an upper end, a lower end and a longitudinal bore extending from said upper end to said lower end, an electrode wire extending through said longitudinal bore and having an upper wire end protruding from said upper end of said torch and a lower wire end protruding from said lower end of said torch, said upper end of said torch having an outer boundary surrounding and spaced radially outwardly from said longitudinal axis; first securing means mounted on said upper end of said torch, said wire brake comprising:

an elongated adapter having a second securing means attachable to said first securing means on said upper end of said torch, said adapter having an adapter bore extending therethrough, said adapter bore being positioned to register with and form a continuation of said upper end of said longitudinal bore in said torch when said first and second securing means are attached to one another;

said adapter having a brake bore providing communication from outside said adapter to said adapter bore;

a cylinder body having a cylinder bore therein and having third securing means for securing said cylinder body to said adapter with said cylinder bore in communication with said adapter bore;

a piston mounted within said cylinder bore for reciprocating movement therein between a release position and a brake position;

a brake member movable with said piston and protruding at least partially into said adapter bore when said piston is in said brake position.

2. A wire brake according to claim 1 wherein said adapter and said cylinder body both are within said outer boundary of said torch.

3. A wire brake according to claim 2 and further comprising a cylindrical housing surrounding said adapter and said cylinder body, said cylindrical housing being attached to said upper end of said torch.

4. A wire brake according to claim 3 wherein said cylindrical housing includes an outer cylindrical surface which is coincident with or located radially inwardly from said outer boundary of said torch.

5. A wire brake according to claim 1 wherein spring means yieldably urge said piston toward said release position.

6. A wire brake according to claim 5 wherein said cylinder body includes fluid inlet means for introducing pressurized fluid into said cylinder bore for causing said piston to move from said release position to said lock position.

7. A wire brake according to claim 1 wherein said brake member includes a distal end having a cupped surface facing said adapter bore.

8. A wire brake according to claim 1 wherein said third securing means includes a cylindrical cap surface with first annular groove extending therearound, said cap surface and said first annular groove fitting within said cylinder bore of said cylinder body, said cylinder bore having a cylindrical bore surface with a second annular groove therein, said first and second annular grooves being registered with one another, a retaining wire surrounding said cap surface and residing at least partially in said registered first and second annular grooves to secure said cap surface within said cylinder bore.

9. A wire brake according to claim 8 wherein at least one opening is provided in said cylinder body and provides communication to said second annular groove within said cylindrical bore surface for permitting removal of said retaining wire from said registered first and second annular grooves.

10. The wire brake according to claim 1 wherein said brake member engages said electrode wire when said piston is in said brake position such that said wire is clamped between said brake member and said adapter bore.

11. A wire brake according to claim 1 wherein said brake member causes said electrode wire to press against said adapter bore when said piston is in said brake position.

12. A wire brake according to claim 1 wherein said brake member exerts a radial force on said electrode wire when said piston is in said brake position causing said electrode wire to deflect radially until said electrode wire makes contact with said adapter bore.

13. A wire brake according to claim 12 wherein said electrode wire is clamped between said brake member and said adapter bore when said piston is in said brake position.

14. A wire brake according to claim 1 wherein said wire brake is removably coupled to said torch.

15. A wire brake according to claim 1 wherein said piston and said cylinder bore are disposed outside of said elongated adapter.

16. In combination:
an elongated torch having a longitudinal axis, an upper end, a lower end, and a longitudinal bore extending from said upper end to said lower end;
first securing means mounted on said upper end of said torch;
an elongated adapter having a second securing means attachable to said first securing means on said upper end of said torch, said adapter having an adapter bore extending therethrough, said adapter bore being positioned to register with and form a continuation of said upper end of said longitudinal bore in said torch when said first and second securing means are attached to one another;
said adapter having a brake bore providing communication from outside said adapter to said adapter bore;
a cylinder body having a cylinder bore therein and having third securing means for securing said cylinder body to said adapter with said cylinder bore in communication with said adapter bore;
a piston mounted within said cylinder bore for reciprocating movement therein between a release position and a brake position;
a brake member movable with said piston and protruding at least partially into said adpater bore when said piston is in said brake position.
an electrode wire extending through said brake bore of said adapter and said longitudinal bore of said torch;
wire feed means engaging said electrode wire for moving said electrode wire longitudinally through said brake bore and said longitudinal bore of said torch, said feed means gripping said electrode wire with a predetermined gripping force;
said brake member engaging said electrode wire when said piston is in said brake position with sufficient force to overcome said gripping force of said wire feed means during movement of said torch relative to said feed means.

17. A method of securely holding an electrode wire to a welding torch having a longitudinal axis, an upper end, a lower end, a longitudinal bore extending from said upper end to said lower end, an electrode wire extending through said longitudinal bore, a first securing means mounted on said upper end of said torch, said method comprising the steps of:
providing an elongated adapter having a second securing means attachable to said first securing means, said adapter having an adapter bore extending therethrough, said adapter bore being positioned to register with and form a continuation of said longitudinal bore;
providing a cylinder body having a cylinder bore therein, said cylinder body coupled to said adapter, said cylinder bore being in communication with said adapter bore;
providing a piston disposed within said cylinder bore for reciprocating movement therein between a release position and a brake position;
providing a brake member movable with said piston and protruding at least partially into said adapter bore when said piston is in said brake position; and
forcing said piston into said brake position causing said brake member to engage said electrode wire clamping said electrode wire between said brake member and said adapter bore.

* * * * *